(No Model.)
W. ROGERS.
DEVICE FOR SEALING THE JOINTS OF GAS PIPES.
No. 418,752. Patented Jan. 7, 1890.
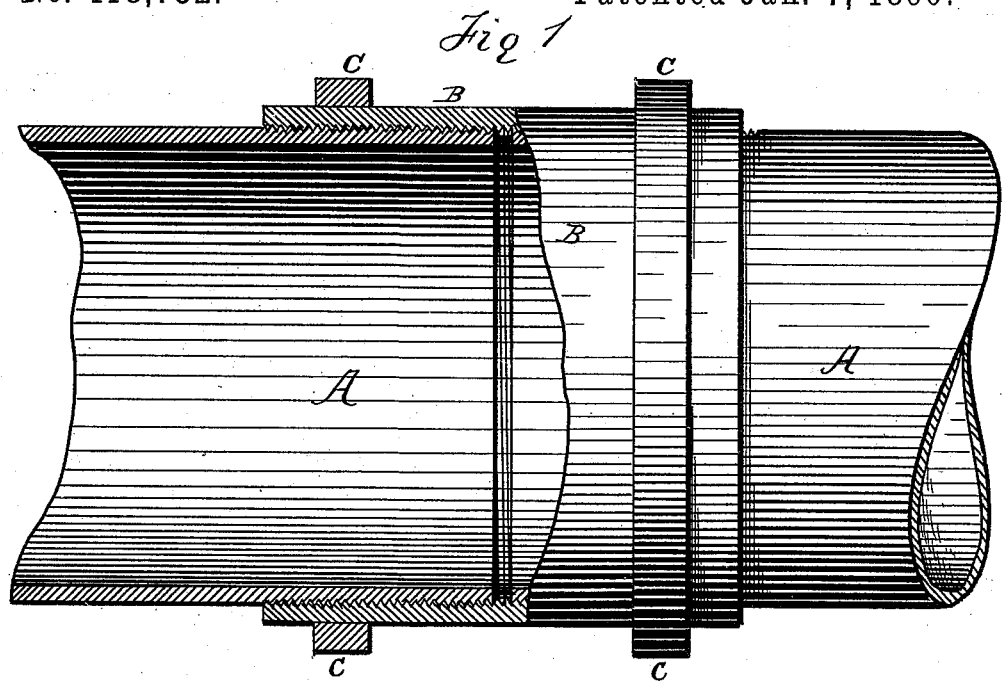
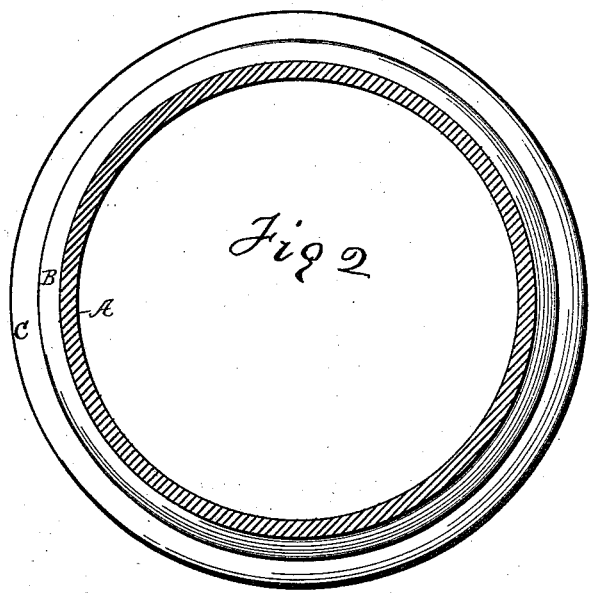
Witnesses:
C. S. Johnston
James J. Johnston
Inventor.
William Rogers
By A. C. Johnston
Attorney

UNITED STATES PATENT OFFICE.

WILLIAM ROGERS, OF PITTSBURG, PENNSYLVANIA.

DEVICE FOR SEALING THE JOINTS OF GAS-PIPES.

SPECIFICATION forming part of Letters Patent No. 418,752, dated January 7, 1890.

Application filed March 11, 1885. Renewed May 4, 1887. Serial No. 237,100. (No model.)

*To all whom it may concern:*

Be it known that I, WILLIAM ROGERS, of Pittsburg, in the county of Allegheny and State of Pennsylvania, have invented a new and useful Improvement in Devices for Sealing the Joints of Gas-Pipes; and I do hereby declare the following to be a full, clear, and exact description thereof.

In natural-gas mains the leakage, as a rule, occurs at the point of union of the ends of the pipes, said pipes being connected by a union or coupling.

My invention has for its object the tightening or sealing of the joints, and is accomplished by surrounding the union or coupling with a heated band, which in the cooling process will contract and thereby impinge on the union and securely tighten it upon the pipe.

To enable others skilled in the art with which my invention is most nearly connected to make and use it, I will proceed to describe its construction and operation.

In the accompanying drawings, which form part of my specification, Figure 1 is a side elevation showing part in section. Fig. 2 is a cross-section of my improvement.

In the drawings, A A represent the pipes for conveying the gas. Said pipes are of the ordinary construction and of any suitable material.

B is the ordinary union or coupling used for connecting the ends of pipes together.

C C represent bands for surrounding the union or coupling.

The operation is as follows: One end of the pipe A is screwed into the union or coupling. The bands C C, which are heated to a suitable degree, are then slipped over the coupling, one of the bands C encircling an end of the coupling. The end of the other pipe A is then screwed into the other end of the union or coupling, and the cooling of the bands C C will contract them, so that they will impinge tightly upon the coupling, and thereby force it tightly down upon the pipes A A and thoroughly seal it, thus preventing any escape of gas and prevent the danger of explosion.

Having thus described my improvement, what I claim is—

1. The combination, with two tube-sections, of a coupling consisting of a metal sleeve or collar formed in one piece and fitting around the ends of the tube-sections, and a metal ring or rings fitting around the sleeve and shrunk thereon, so as to compress the metal of the sleeve upon the metal of the tube-sections and form a tight joint, substantially as and for the purposes set forth.

2. The combination, with tube-sections having threaded ends, of a sleeve having threaded inner surface engaging said sections, and an external ring or rings shrunk on said sleeve, substantially as described.

In testimony whereof I have hereunto set my hand this 27th day of January, A. D. 1885.

WILLIAM ROGERS.

Witnesses:
A. C. JOHNSTON,
C. S. JOHNSTON.